Jan. 7, 1930.  W. GATTER  1,742,387
VEHICLE AXLE
Filed March 22, 1928  2 Sheets-Sheet 1
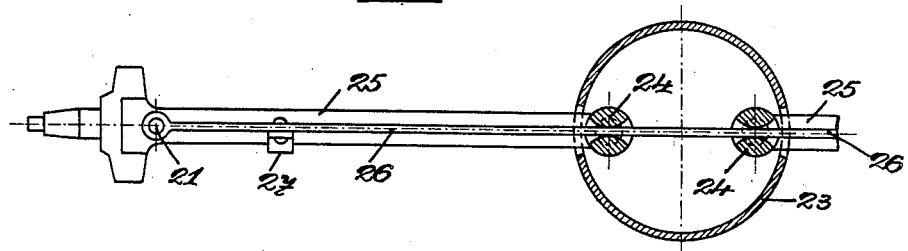
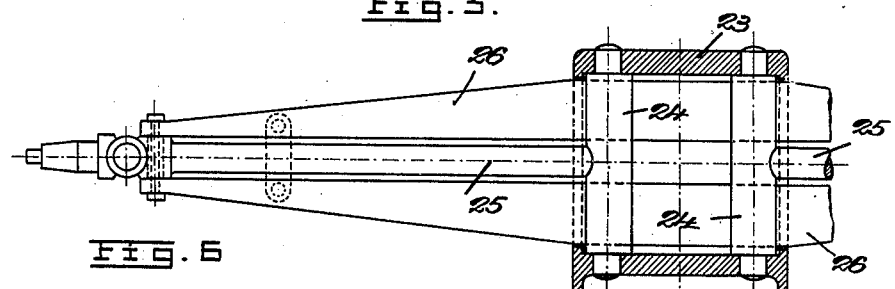
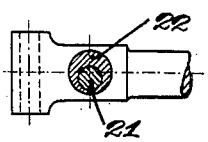
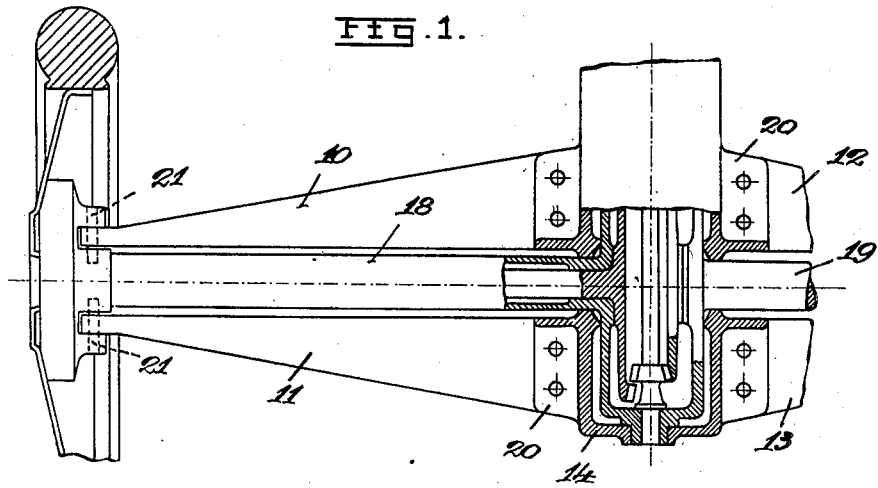
W. Gatter
INVENTOR
By: Marks & Clark
ATTYS Jan. 7, 1930.  W. GATTER  1,742,387
VEHICLE AXLE
Filed March 22, 1928  2 Sheets-Sheet 2
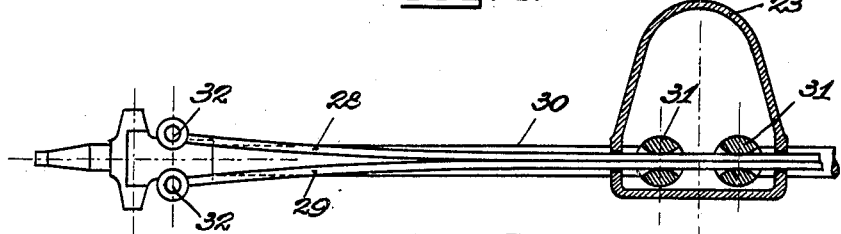
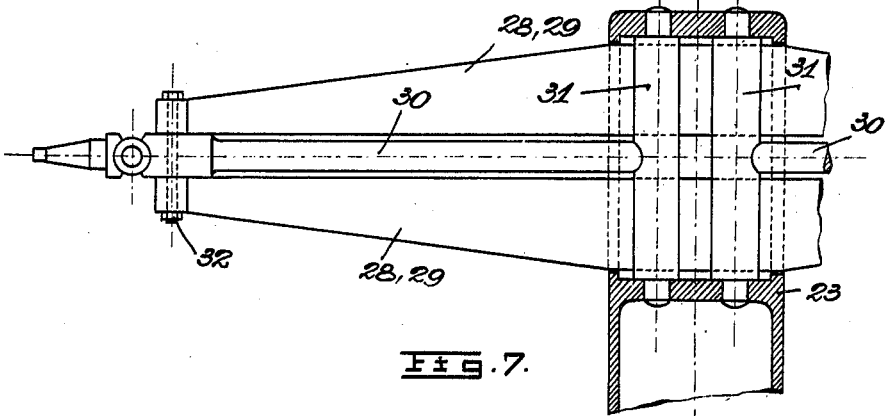
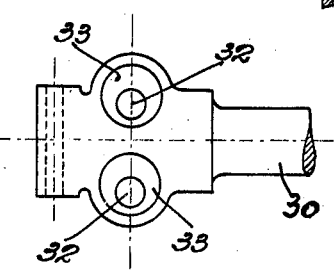
W. Gatter
INVENTOR Patented Jan. 7, 1930

1,742,387

UNITED STATES PATENT OFFICE

WILLIBALD GATTER, OF AUSSIG-SCHRECKENSTEIN, CZECHOSLOVAKIA

VEHICLE AXLE

Application filed March 22, 1928, Serial No. 263,794, and in Czechoslovakia March 31, 1927.

This invention relates to a device for supporting tiltable axles, more particularly for power driven vehicles in which the end of the shaft adjacent to the wheel is clamped between two springs which have the form of single leaf springs and lie edge-on in the direction of travel.

It is the object of the present invention to arrange these springs in such a manner that the entire length of the springs between the outer ends of the shafts is available for the springing.

In the accompanying drawings, Fig. 1 shows the arrangement of the springs according to U. S. patent application Serial No. 263,793, in section, as applied to a rear driving axle, Fig. 2 is a front elevation, partly in section and Fig. 3 a plan view, partly in section showing the mounting springs, Fig. 4 is a front elevation, partly in section and Fig. 5 a plan view, partly in section of another constructional form of the invention in which at either side of the shafts 2 single leaf springs are provided, and Figs. 6 and 7 show in section and in side elevation respectively the journalling of the pins connecting the springs to the shaft heads.

According to patent application Serial No. 263,793, see Fig. 1, the single sheet springs 10, 11 or 12, 13 lie on either side of the tiltable shafts 18, 19. The springs lie one behind the other in a horizontal plane passing approximately through the wheel centres and are edge-on in the said plane in the direction of travel. At their inner ends the springs are rigidly fixed to the gear box 14 by means of the flanges 20 on the same. The outer ends of the springs are connected by pins 21 to the shaft head and are journalled in the latter (Figs. 6, 7) in the eccentric bores of the bushes 22 in the said heads.

Through the springs 10, 11, 12, 13 being fixed to the flanges 20, the useful length of the springs is shorter than is required in practice. In order to overcome this drawback according to the present invention, the transverse pins 24 of the T-shaped tiltable shafts 25 are journalled so as to be rotatable in the vehicle body 23 which is to be sprung and the springs 26 extending from outer end to outer end of the tiltable shafts lie in slots in the transverse pins 24. By this arrangement the entire distance between the outer ends of the tiltable shafts becomes available for the springs and a spring action over their entire length is possible.

According to Figures 1–3 the outer ends of the springs are connected by the pins 21 to the shaft head, while the straps 25 connect the springs lying on either side of the shafts.

In the constructional form shown in Figs. 4, 5 and 7 two springs 28, 29 lie on either side of the tiltable shafts 30, the springs extending jointly through slots in the transverse pins 31 of the said shafts. Hence, in this case as well the length of the springs between the transverse pins is effective.

The outer ends of the springs are connected to the shaft heads in the manner already described by pins 32 which are journalled in the eccentric bores of the bushes 33 which are inserted in the shaft heads.

What I claim is:

1. A flexible axle for vehicles, comprising the combination with shafts for the road wheels, said shafts having transverse pins at one end journalled in the vehicle body so as to enable the shafts to tilt and being adapted to receive a road wheel at the opposite end, of single-leaf springs at each side of said shafts, said springs being attached to the shafts at the ends thereof adjacent the wheels and arranged so as to lie edge-on in the direction of travel of the vehicle, and guide slots in the transverse pins of the shafts, the single-leaf springs being passed through said slots, as and for the purposes set forth.

2. A flexible axle for vehicles as set forth in claim 1, having two single-leaf springs arranged one above the other on each side of the shafts, each pair of leaf springs being passed through a single guide slot in the pins of the shafts, as and for the purposes set forth.

In testimony whereof I have signed my name to this specification.

WILLIBALD GATTER.